United States Patent [19]

Jarman et al.

[11] 4,167,108

[45] Sep. 11, 1979

[54] ADJUSTABLE HOLE-ENGAGING HOOK DEVICE

[76] Inventors: Davis R. Jarman, 612 Ward Dr.; Virgil H. Hinson, 206 Fairway Oaks, both of Brunswick, Ga. 31520

[21] Appl. No.: 837,409

[22] Filed: Sep. 28, 1977

[51] Int. Cl.² .................... B21D 31/00; A44G 13/00
[52] U.S. Cl. ......................................... 72/477; 72/705; 294/82 R; 24/230.5 R; 24/201 HE; 24/73 HH
[58] Field of Search ............... 24/201 HE, 230.5 AD, 24/230.5 R, 73 TH, 73 HH; 294/82; 72/705, 477

[56] References Cited

U.S. PATENT DOCUMENTS

| | | | |
|---|---|---|---|
| 366,871 | 7/1887 | Petrie | 24/230.5 AD |
| 965,821 | 7/1910 | Johns | 294/82 R |
| 1,007,769 | 11/1911 | Bugge | 294/82 R |
| 1,083,657 | 1/1914 | Boice | 294/82 R |
| 1,636,654 | 7/1927 | Wright | 294/82 R |
| 2,480,923 | 9/1949 | Hatchette | 24/230.5 R |
| 3,092,412 | 6/1963 | Drake | 24/73 HH |
| 3,495,431 | 2/1970 | Landon | 24/230.5 R |
| 4,022,134 | 5/1977 | Krokos | 24/230.5 R |

*Primary Examiner*—Bernard A. Gelak
*Attorney, Agent, or Firm*—Clarence A. O'Brien; Harvey B. Jacobson

[57] ABSTRACT

An adjustable hole-engaging hook device has a body connectable to a pulling element, such as a chain, and a hook assembly mounted on the body and arrangeable in a hole as conventionally provided in a vehicle frame member for permitting a force to be exerted on the frame of the vehicle. A gripping arrangement is provided on the body of the device for positively engaging the vehicle frame member which is provided with a hole in which the hook assembly is removably engageable.

10 Claims, 9 Drawing Figures

ADJUSTABLE HOLE-ENGAGING HOOK DEVICE

BACKGROUND OF THE INVENTION

1. Field of the Invention

This invention relates generally to frame anchoring tools, and particularly to such a tool designed to be insertable into the holes conventionally provided on automobile frames for the purpose of securing the vehicle while same is being pulled for repairs.

2. Description of the Prior Art

U.S. Pat. Nos. 3,464,720, issued Sept. 2, 1969 to J. C. Abromavage, et al, and 3,631,705, issued Jan. 4, 1972 to S. A. McCaffrey, disclose anchoring devices intended to engage holes provided in associated vehicle frames so as to exert a force on the frame. These known anchoring devices employ merely a single shaft or pin which is intended to receive, in shear, forces supplied to the anchoring device, with the arrangement shown in U.S. Pat. No. 3,464,720 thus exposing only a very limited area to the engagement of the anchor with the frame along the direction of force supplied to the anchor. The arrangement set forth in U.S. Pat. No. 3,631,705 attempts to overcome the problem of tearing of the hole provided in the frame by use of a disc which conforms to the hole itself. A limitation on the usefulness of the latter approach, however, is that a different size disc must be employed in conjunction with a given diameter hole provided in the vehicle frame, since these hole diameters vary substantially.

SUMMARY OF THE INVENTION

It is an object of the present invention to provide an adjustable hole-engaging hook adaptable to engage with different size holes as provided on motor vehicle frames.

It is another object of the present invention to provide a hole-engaging hook device provided with a gripping arrangement designed to prevent tearing of the hole provided in the frame.

These and other objects are achieved according to the present invention by providing an adjustable hole-engaging hook device having: a body connectable to a pulling element, such as a chain; a hook assembly mounted on the body and arrangeable in a hole provide in a vehicle frame member; and a gripping arrangement provided on the body for positively engaging the vehicle frame member provided with a hole in which the hook assembly is engaged.

According to a preferred embodiment of the invention, the hook assembly includes an adapter head rotatably mounted on the body and comprising a plurality of hooks selected for engagement with holes of varying sizes provided on different vehicle frame members. A detent is advantageously mounted on one of the body and head of the device for engaging the other of the body and head and indexing the head with respect to the body. The other of the body and the head is thus provided with a plurality of recesses arranged for sequentially placing the hooks into a position for cooperating with the gripping arrangement. Further, a longitudinally extending leaf spring retainer extends cantilever-fashion from the head for insertion into a hole to which the device is to be anchored before a selected one of the hooks of the device for preventing the hook from falling out of the hole until the gripping arrangement is set into the vehicle frame member.

The body advantageously is provided with a through window and a bore extending perpendicularly from the window and through the body. The hook assembly further includes a bolt comprising a cap and a shank provided with external screw threads, with the shank being removably received in the bore provided in the body. A nut having internal screw threads threadingly engages the external screw threads of the shank for retaining the bolt in the bore, with one of the nut and cap of the bolt being arranged in the window provided in the body. The head is provided with a through opening, and the shank is removably and rotatably received in the opening as well as in the bore for rotatably mounting the head on the body of the device.

The gripping arrangement includes a plurality of wedge-shaped teeth angled away from the head and toward an arrangement for attachment of the body to a flexible element, such as a chian, with the teeth of the gripping arrangement being disposed on the body adjacent the head of the device. The window is advantageously arranged in the body between the teeth of the gripping arrangement and the attachment arrangement.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
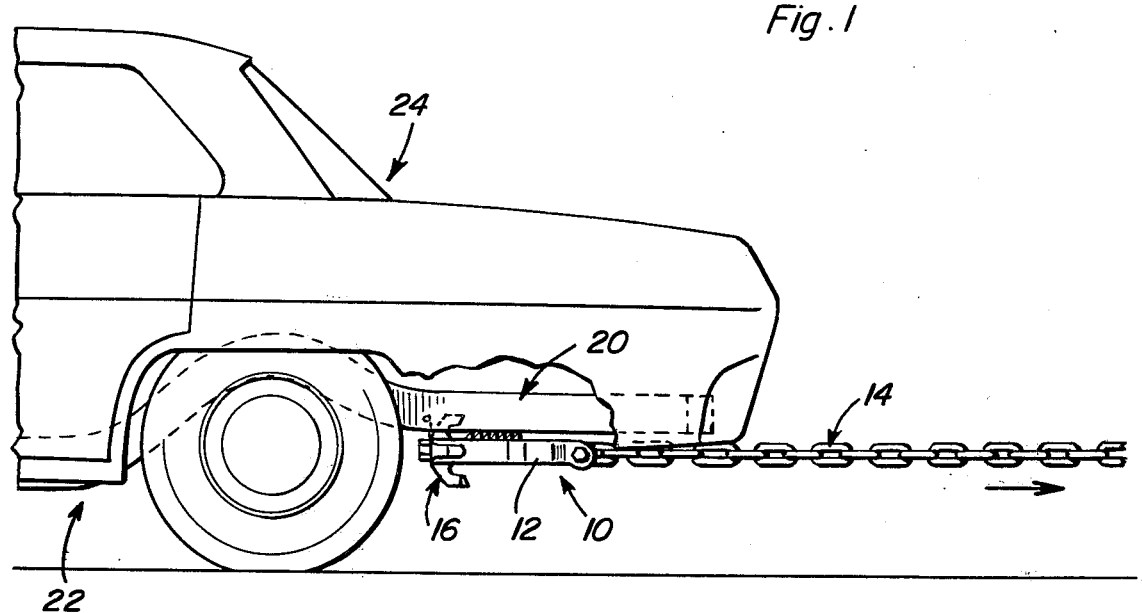
FIG. 1 is a fragmentary, schematic, side elevational view showing an adjustable hole-engaging device according to the present invention anchored on the frame of a motor vehicle.
Figure 2:
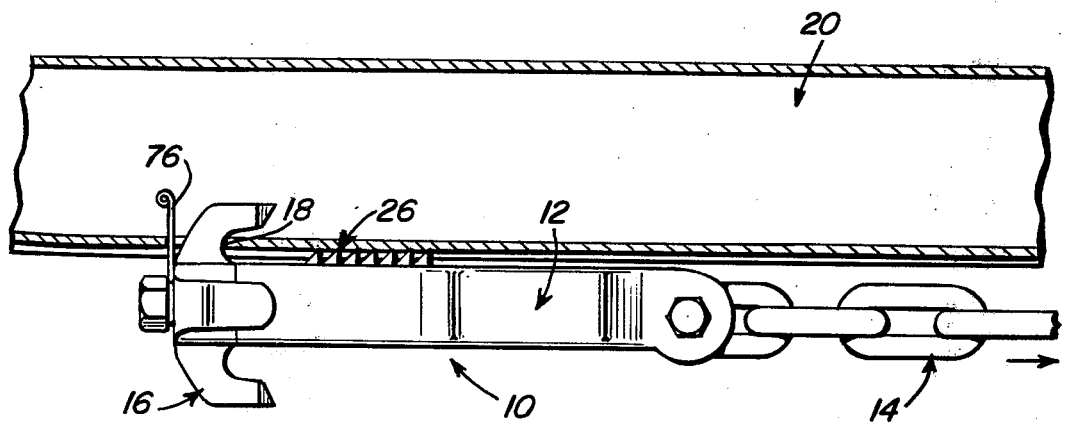
FIG. 2 is an enlarged, fragmentary, vertical, longitudinal sectional view showing the manner in which the hook device according to the present invention is anchored to the vehicle frame.
Figure 3:
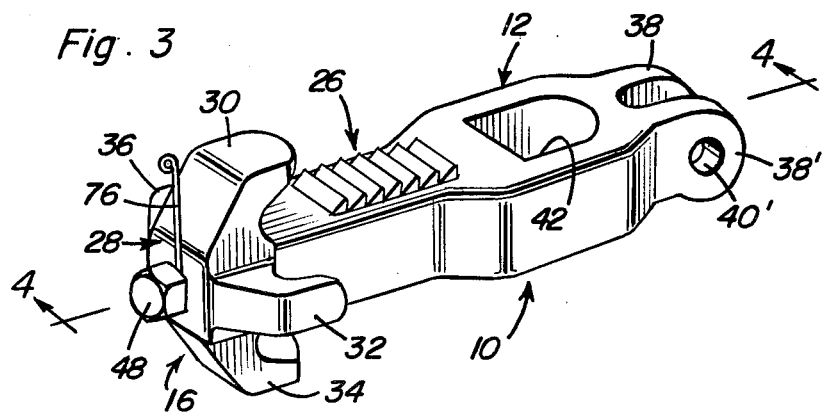
FIG. 3 is a perspective view showing an adjustable hole-engaging hook device according to the present invention.
Figure 4:
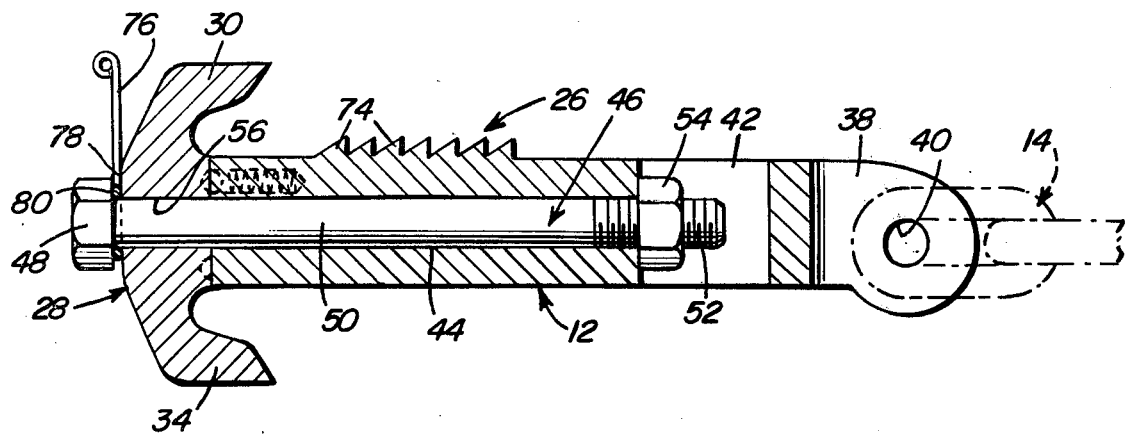
FIG. 4 is an enlarged, sectional view taken generally along the line 4—4 of FIG. 3.
Figure 5:
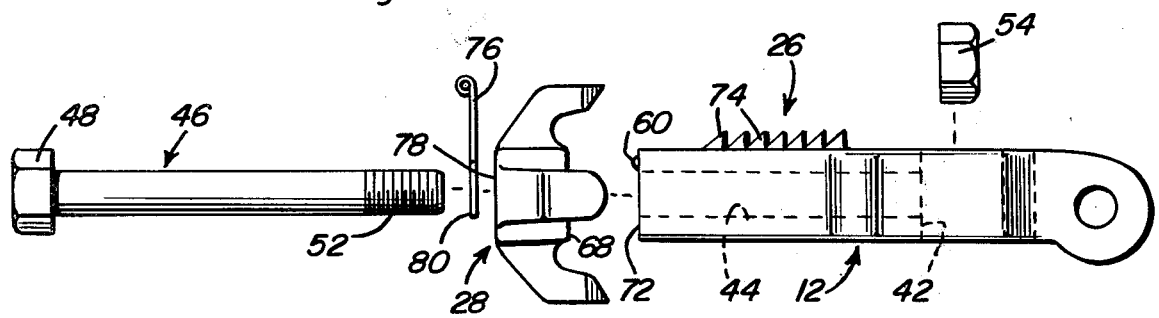
FIG. 5 is an exploded, side elevational view showing the hook device as seen in FIGS. 3 and 4.

Referring now more particularly to FIGS. 1 and 2 of the drawings, an adjustable hole-engaging hook device 10 comprises a body 12 connectable to a pulling element such as chain 14 in order for permitting a force to be applied to device 10 in order to straighten motor vehicle frames, and the like. Device 10 further comprises a hook assembly 16 mounted on body 12 and arrangeable in hole 18 provided in a member 20 of a frame 22 of a motor vehicle 24 of conventional construction. Provided on body 12 for positively engaging frame member 20 is a gripping arrangement 26 intended to take pressure off hook assembly 16 as force on body 12 increases in order to prevent tearing of member 20 adjacent to hole 18.

Referring now more particularly to FIGS. 3–9 of the drawings, hook assembly 16 includes an adapter head 28 rotatably mounted on one longitudinal end of body 12, which head 28 comprises a plurality of hooks 30, 32, 34, and 36 of different sizes selected for engagement with holes such as hole 18 of varying sizes as conventionally provided on the frame members of different make vehicles. It is contemplated by the invention to have two or more adapter heads such as head 28 in a set provided with a device 10 in order to increase the number of hooks available to cover any number of hole sizes encountered.

Body 12 is provided at the longitudinally spaced end thereof from where head 28 is mounted with a pair of tongues 38 and 38' in each of which a respective eye 40, 40' is provided. These tongues 38, 38' and eyes 40, 40' form an arrangement for permitting attachment of a flexible pulling element, such as chain 14 to body 12 in such a manner that a pulling force is exerted on body 12 along the longitudinal axis thereof.

Body 12 is provided with a through window 42 and bore 44 extending perpendicularly from window 42 and through body 12 in the direction toward head 28. A bolt 46 comprising a cap 48 and a shank 50 having external screw threads 52 thereon is arranged with shank 50 removably received in bore 44 and a nut 54 having internal screw threads threadingly engages with the screw threads 52 provided on shank 50 for retaining bolt 46 in bore 44. As illustrated, nut 54 is preferably arranged within window 42 in order to facilitate assembly and disassembly of the device. Head 28 is provided with a through opening 56, and shank 50 is removable and rotatably received in the opening 56 as well as bore 44 for rotatably mounting the head 28 on body 12.

Figure 6:
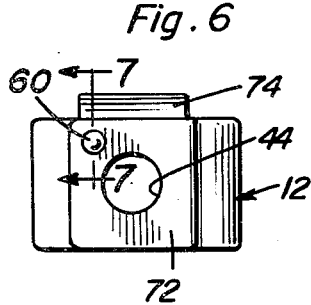
FIG. 6 is an end elevational view of the body of the hook device as seen in FIGS. 3–5 and looking from the left in FIGS. 4 and 5 toward the end of the element.
Figure 7:
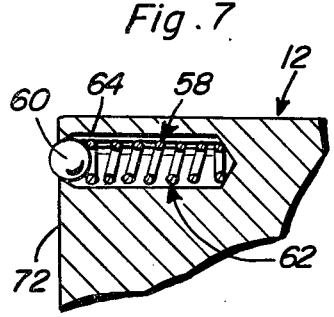
FIG. 7 is an enlarged, fragmentary, sectional view taken generally along lines 7—7 of FIG. 6.
Figure 8:
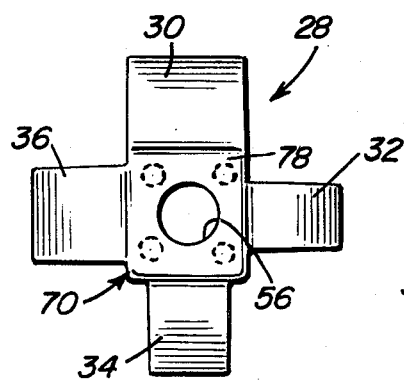
FIG. 8 is a front elevational view showing a hook-carrying head of the present invention.
Figure 9:
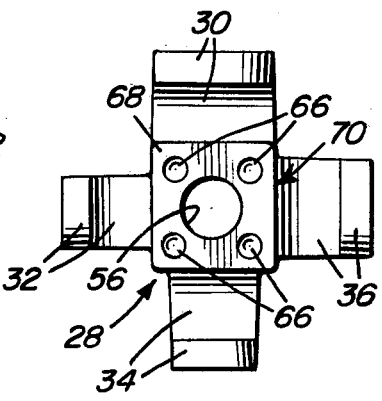
FIG. 9 is a rear elevational view similar to FIG. 8, but showing the back side of a hook-carrying head according to this invention.

Hook assembly 16 further includes a detent 58 mounted on one of body 12 and head 28 for engaging the other of head 28 and body 12 and indexing 28 with respect to body 12. As seen in FIGS. 6 and 7, detent 58 is preferably mounted on body 12 and includes a ball 60 biased away from body 12 by a coiled compression spring 62 disposed in a socket 64 formed in the end wall or face of body 12 against which head 28 abuts. A plurality of indentations 66 are provided on the rear face 68 of hub 70 of head 28 for selective engagement with ball 60 in order to hold head 28 in a desired position relative to gripping arrangement 26. That is, a particular hook, 30, 32, 34, 36 to be employed should be in alignment with gripping arrangement 26. Face 72 which forms the end wall of bore 46 against which head 28 abuts cooperates with face 68 to form a bearing facilitating rotation of head 28 relative to body 12.

Gripping arrangement 26 includes a plurality of wedge-shaped teeth 74 angled away from head 28 and toward the tongues 38, 38'. These teeth 74 are disposed on body 12 adjacent head 28, with window 42 being provided in body 12 between teeth 74 and tongues 38, 38'. As will be appreciated, the presence of teeth 74 will cause body 12 to positively engage with the abutting frame member 20 as a force is applied to body 12 along the longitudinal extent thereof in order to prevent a particular one of the hooks 30, 32, 34, 36 arranged in hole 18 from tearing hole 18 as force on the device 10 increases.

A longitudinally extending leaf spring retainer 76 extends cantilever-fashion from head 28, being retained between cap 48 of bolt 46 and the front surface or face 78 of head 28. This retainer 76 is insertable into hole 18 before one of the hooks 30, 32, 34, 36 for preventing the hook from falling out of hole 18 before the teeth 74 of gripping arrangement 26 are set into frame member 20. A loop 80 is formed at the anchored end of retainer 76 for surrounding the shank 50 of bolt 46 immediately adjacent cap 48 and facilitate retention of retainer 76 between cap 48 and face 78.

As can be readily understood from the above description and from the drawings, an adjustable hole-engaging hook provides a simple yet reliable manner of anchoring a hook to a conventional motor vehicle frame. Once a desired hook size is selected, head 28 is rotated to align the hook selected with gripping teeth 74. Detent 58 will cooperate with one of the indentations 66 to hold head 28 in the desired orientation with respect to body 12 and teeth 74. Retainer 76 is now pushed into hole 18 first, followed by the selected one of the hooks. As can perhaps best been seen from FIG. 2 of the drawings, spring retainer 76 will prevent the selected hook from falling out of the hole 18 until such time as sufficient force is applied by chain 14 to body 12 of device 10 to cause the teeth 74 of gripping arrangement 26 to grip the material, usually steel or other metal, forming the frame member 20. In this manner, tearing of the material forming hole 18 is prevented, while a hook device according to the invention still permits versatility capable of use with holes as provided on virtually any manufacture of motor vehicle frame.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An adjustable hole-engaging hook device, comprising, in combination:
   (a) a body connectable to a pulling element;
   (b) hook means mounted on the body and arrangeable in a hole provided in a vehicle frame member; and
   (c) gripping means provided on the body for positively engaging the vehicle frame member provided with a hole in which the hook means is engageable as increasing force is applied to the body by a pulling element, the hook means including an adapter head rotatably mounted on the body and comprising a plurality of hooks of different sizes selected for engagement with holes of varying sizes provided on different vehicle frame members, the body including means for attachment to a pulling element, the means for attachment being spaced from the hook means, and the gripping means including a wedge-shaped tooth angled away from the hook means and toward the means for attachment, the body being pulled toward the means for attachment so as to set the tooth into an associated frame member.

2. An adjustable hole-engaging hook device, comprising, in combination:
   (a) a body connectable to a pulling element;
   (b) hook means mounted on the body and arrangeable in a hole provided in a vehicle frame member; and
   (c) gripping means provided on the body for positively engaging the vehicle frame member provided with a hole in which the hook means is engageable as increasing force is applied to the body by a pulling element, the hook means including an adapter head rotatably mounted on the body and comprising a plurality of hooks of different sizes selected for engagement with holes of varying sizes provided on different vehicle frame members, the hook means further including detent means mounted on one of the body and the head for engaging the other of the body and the head and indexing the head with respect to the body, the other of the body and head being provided with a plurality of recesses arranged for sequentially placing the hooks into a position for cooperating with the gripping means.

3. A structure as defined in claim 2, wherein the body includes means for attachment to a pulling element, the means for attachment being spaced from the hook means, and the gripping means including a plurality of wedge-shaped teeth angled away from the hook means and toward the means for attachment, the body being pulled toward the means for attachment so as to set the teeth into an associated frame member.

4. A structure as defined in claim 2, wherein a longitudinally extending leaf spring retainer extends cantilever-fashion from the head, the retainer being insertable into a hole provided on a vehicle frame member before a selected one of the hooks provided on the head of the hook means for preventing the hook from falling out of the hole before the gripping means positively engages the associated frame member.

5. An adjustable hole-engaging hook device, comprising, in combination:
 (a) a body connectable to a pulling element;
 (b) hook means mounted on the body and arrangeable in a hole provided in a vehicle frame member; and
 (c) gripping means provided on the body positively engaging the vehicle frame member provided with a hole in which the hook means is engageable as increasing force is applied to the body by a pulling element, the hook means including an adapter head rotatably mounted on the body and comprising a plurality of hooks of different sizes selected for engagement with holes of varying sizes provided on different vehicle frame members, a longitudinally extending leaf spring retainer extending cantilever-fashion from the head, the retainer being insertable into a hole provided on a vehicle frame member before a selected one of the hooks provided on the head of the hook means for preventing the hook from falling out of the hole before the gripping means positively engages the associated frame member.

6. A structure as defined in claim 5, wherein the body includes means for attachment to a pulling element, the means for attachment being spaced from the hook means, and the gripping means including a plurality of wedge-shaped teeth angled away from the hook means and toward the means for attachment, the body being pulled toward the means for attachment so as to set the teeth into an associated frame member.

7. An adjustable hole-engaging hook device, comprising, in combination:
 (a) a body connectable to a pulling element;
 (b) hook means mounted on the body and arrangeable in a hole provided in a vehicle frame member; and
 (c) gripping means provided on the body for positively engaging the vehicle frame member provided with a hole in which the hook means is engageable as increasing force is applied to the body by a pulling element, the hook means including an adapter head rotatably mounted on the body and comprising a plurality of hooks of different sizes selected for engagement with holes of varying sizes provided on different vehicle frame members, the body being provided with a through window and bore extending perpendicularly from the window and through the body, the hook means further including a bolt comprising a cap and a shank provided with external screw threads along at least a portion thereof, the shank being removably received in the bore, and a nut having internal screw threads threadingly engaging the screw threads of the shank for retaining the bolt in the bore, one of the nut and cap of the bolt being arranged in the window, the head being provided with a through opening, said shank being removably and rotatably received in the through opening provided in the head as well as in the bore provided in the body for rotatably mounting the head on the body.

8. A structure as defined in claim 7, wherein the body includes means for attachment to a pulling element, and the gripping means includes a plurality of wedge-shaped teeth angled away from the head and toward the means for attachment, with the teeth being disposed on the body adjacent the head, said window being provided in the body between the teeth and the means for attachment.

9. A structure as defined in claim 8, wherein the hook means further includes detent means mounted on one of the body and the head for engaging the other of the body and the head and indexing the head with respect to the body, the other of the body and head being provided with a plurality of recesses arranged for sequentially placing the hooks into a position for cooperating with the gripping means.

10. A structure as defined in claim 9, wherein a longitudinally extending leaf spring retainer extends cantilever-fashion from the adapter head between, and retained by, the nut or cap of the bolt and the head, the retainer being insertable into a hole provided in an associated body frame member before a selected one of the hooks for preventing the selected one of the hooks from falling out of the hole provided in the frame member before the gripping means positively engages the frame member.

* * * * *